(12) United States Patent
Esumi et al.

(10) Patent No.: US 7,864,466 B2
(45) Date of Patent: Jan. 4, 2011

(54) SIGNAL PROCESSING APPARATUS AND A SIGNAL STORAGE SYSTEM

(75) Inventors: Atsushi Esumi, Kyoto (JP); Hidemichi Mizuno, Musashimurayama (JP)

(73) Assignee: Rohm Co., Ltd. (JP)

( * ) Notice: Subject to any disclaimer, the term of this patent is extended or adjusted under 35 U.S.C. 154(b) by 1135 days.

(21) Appl. No.: 11/523,992

(22) Filed: Sep. 20, 2006

(65) Prior Publication Data
US 2007/0206710 A1    Sep. 6, 2007

(30) Foreign Application Priority Data
Sep. 22, 2005  (JP) .............................. 2005-276710

(51) Int. Cl.
*G11B 20/10*    (2006.01)
(52) U.S. Cl. ......................... 360/39; 375/346
(58) Field of Classification Search ................ None
See application file for complete search history.

(56) References Cited

U.S. PATENT DOCUMENTS

| | | | | |
|---|---|---|---|---|
| 7,184,486 B1* | 2/2007 | Wu et al. | ..................... | 375/262 |
| 7,237,173 B2* | 6/2007 | Morita et al. | ............... | 714/755 |
| 7,321,643 B2* | 1/2008 | Chang et al. | ................ | 375/341 |
| 7,337,385 B2* | 2/2008 | Harada | ....................... | 714/781 |

FOREIGN PATENT DOCUMENTS

| | | |
|---|---|---|
| JP | 2004-145972 | 5/2004 |
| JP | 2004-164767 | 6/2004 |

OTHER PUBLICATIONS

Japanese Notification of Reasons(s) for Refusal for Japanese Patent Application No. 2005-276710 dispatched Jun. 24, 2008 with English Translation.
Zining Wu, "Coding and Iterative Detection for Magnetic Recording Channels", USA, Kluwer Academic Publishers, 2000, p. 74-76.
Japanese Office Action for Japanese Patent Application No. 2005-276710 dated Sep. 30, 2008 with English Translation.

* cited by examiner

*Primary Examiner*—Jason C Olson
(74) *Attorney, Agent, or Firm*—Cantor Colburn LLP

(57) ABSTRACT

In general, circuit scale in a DAE is large. The proposed DAE includes First multipliers, Unit processing circuits and Combined circuits. First multipliers use temporary estimated values to respectively compute signals. Unit processing circuits use the signals, which are multiplication results of the first multipliers, to respectively compute signals. Combined circuits use the signals, outputted from the unit processing circuits, to compute respective logarithm likelihood ratios $\lambda 4$ and $\lambda 5$. Here, in the unit processing circuits, by sharing part of circuits related to computing continuous $\lambda$s, the circuit scale of the DAE is reduced. For example, with regard to computation of $\lambda 4$ and $\lambda 5$, part of four unit processing circuits is shared.

9 Claims, 8 Drawing Sheets

408

SIGNAL PROCESSING APPARATUS AND A SIGNAL STORAGE SYSTEM

BACKGROUND OF THE INVENTION

1. Field of the Invention

The present invention relates to technology for processing signals belonging to an input signal series.

2. Description of the Related Art

When encoded signals are decoded and when signals are detected, detection and correction of errors due to noise and the like are carried out. A circuit is necessary, of a scale corresponding to computational effort of the error detection and correction. For example, in cases of combinations of a partial response system (referred to below as PR) and low density parity check (LDPC) code, preferable performance can be obtained if iteration decoding is used with decoding thereof. However, in these cases, the circuit scale is enlarged, corresponding to the number of times the decoding is repeated. In order to curtail this enlargement of the circuit scale, technology is known in which a digital aided equalizer (abbreviated to DAE below) is used together with an LDPC decoder. In Patent Document 1, technology is disclosed in which the DAE is used in iteration decoding of a signal that is LDPC encoded, for a read channel in a magnetic disk device.

Patent Document 1: Japanese Patent Application, Laid Open No. 2004-145972

Patent Document 2: Japanese Patent Application, Laid Open No. 2004-164767

However, as described below, a very large amount of computational processing is necessary inside the DAE. The scale of the DAE circuit corresponds to this computational amount, and there is room for improvement in optimizing the circuit scale of the DAE itself.

SUMMARY OF THE INVENTION

The present invention has been made in view of the above-mentioned circumstances, and a general purpose is to reduce circuit scale in a DAE itself.

One aspect of the present invention relates to a signal processing apparatus. The signal processing apparatus for applying prescribed processing to an input signal series and computing a logarithm likelihood ratio includes: plural unit processing circuits for executing unit processing of a part of the prescribed processing, for, respectively, signals to be processed, belonging to the input signal series, that are now about to undergo the prescribed processing, and to a prescribed number of signals related to the signals to be processed; and a combined circuit for integrating output of the plural unit processing circuits, to complete the prescribed processing; wherein the plural unit processing circuits are configured to do unit processing corresponding to every item in which a computational expression of the logarithm likelihood ratio is expanded, and at least a part of the plural unit processing circuits is shared as a part of the unit processing circuits with regard to the prescribed processing related not only to the signals to be processed, but to signals related to the signals to be processed.

"Signals related to the signals to be processed" may be signals positionally or temporally related to the signals to be processed. As an example thereof, in the input signal series, the signals may be a signal positioned before the signals to be processed, a signal positioned after the signals to be processed, or signals positioned sandwiching the signals to be processed. In addition, these signals may be continuous or may be discontinuous.

A part of the plural unit processing circuits may be an adder circuit that sums output of a multiplier circuit that respectively multiplies the signals to be processed and the signals related to the signals to be processed by a prescribed multiplier value. Furthermore, the signals to be processed may be temporary estimated values of encoded signals, and the prescribed multiplier value may be a target value of a waveform equalization of a signal by a partial response system.

The plural unit processing circuits may further include a subtractor circuit for subtracting output of the adder circuit from a prescribed subtractor value. In addition, the prescribed subtractor value may be output of a FIR filter. Here, the "FIR filter" is a so-called finite impulse response filter.

The input signal series may originate from a signal series read from a recording device.

According to this signal processing apparatus, since a part of a circuit, corresponding to duplicated places among various items in which a computational expression of the logarithm likelihood ratio is expanded, is shared in computation of the various items, multiple circuits need not be provided for the duplicated places, and overall the circuit scale can be reduced.

Another aspect of the present invention is related to a signal storage system. This signal storage system includes a write channel and a read channel. The write channel includes a first encoder for run-length encoding of data, a second encoder for further encoding data encoded by the first encoder, using a low density parity check code, and a writing unit for writing the data encoded by the second encoder, to the storage device. The read channel includes a soft output detection unit for calculating likelihood for data read from the storage unit and outputting a soft decision value, a second decoder, corresponding to the second encoder, for decoding the data outputted from the soft output detection unit, and a first decoder, corresponding to the first encoder, for further decoding the data decoded by the second decoder. The second decoder applies prescribed processing to inputted data to compute the logarithm likelihood ratio, and is provided with plural unit processing circuits for executing unit processing of a part of the prescribed processing, for, respectively, data elements to be processed, belonging to the input data, that are now about to undergo the prescribed processing, and to a prescribed number of data elements related to the data elements to be processed; and a combined circuit for integrating output of the plural unit processing circuits, to complete the prescribed processing. The plural unit processing circuits are configured to do unit processing corresponding to every item in which a computational expression of the logarithm likelihood ratio is expanded, and at least a part of the plural unit processing circuits is shared as a part of the unit processing circuits with regard to the prescribed processing related not only to the data elements to be processed, but to the data elements related to the data elements to be processed. The signal storage system may be integrated on at least one semiconductor board. According to this signal storage system, since the scale of the unit processing circuits can be decreased, circuit scale can be reduced for the overall signal storage system having the read channel.

The "data elements related to data elements to be processed" may be data elements related positionally or temporally to the data elements to be processed. As an embodiment thereof, in the input data, the data elements may be a data element positioned before the data elements to be processed, a data element positioned after the data elements to be processed, or data elements positioned sandwiching the data elements to be processed. In addition, these data elements may be continuous or may be discontinuous.

Another aspect of the present invention is related to the signal storage system. The signal storage system may further include a storage device for storing data, and a controller for controlling writing of data to the storage device, and reading of data from the storage device. The read channel, in accordance with an instruction of the controller, reads data stored in the storage device, and the write channel, in accordance with an instruction of the controller, writes prescribed data to the storage device. In this way, accompanying reduction in scale of the unit processing circuits, it is possible to realize reduction in circuit scale for the overall signal storage system.

Furthermore, optional combinations of the above component elements, with the description of the present invention transformed among methods, devices, system, computer programs, storage media, and the like, are also valid embodiments of the present invention.

DETAILED DESCRIPTION OF THE INVENTION

The invention will now be described by reference to the preferred embodiments. This does not intend to limit the scope of the present invention, but to exemplify the invention.

The present embodiment has a general purpose of reducing circuit scale of a DAE in itself. In the present embodiment, an explanation is give of an example in which LDPC decoding is done, with regard to reading a signal, that is data, from a magnetic disk device. Specifically, a computational expression for a logarithm likelihood ratio performed inside the DAE is transformed, and a circuit corresponding to a duplicated portion in this transformed expression is shared, to reduce the circuit scale.

Figure 1:
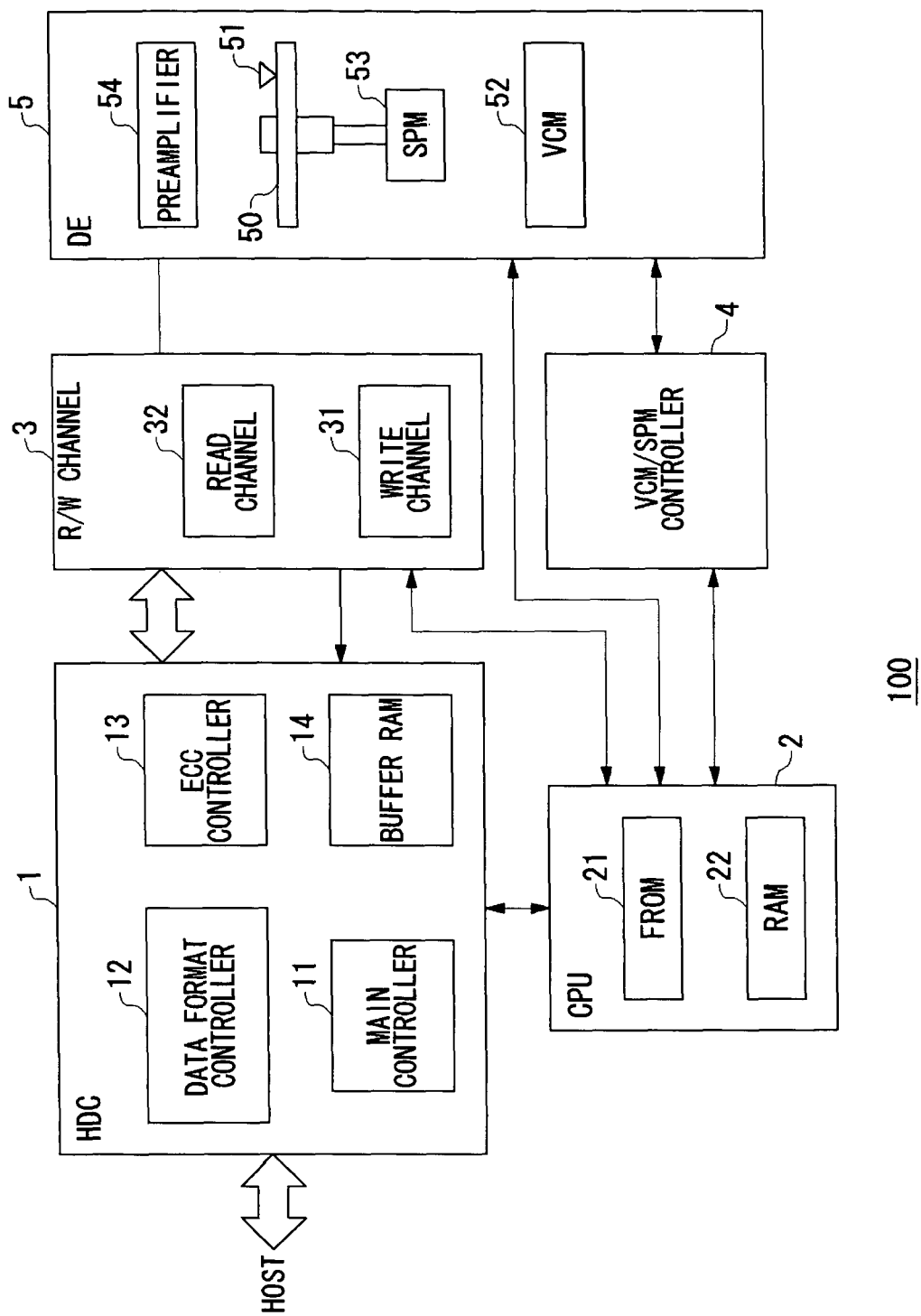
FIG. 1 is a view showing a configuration of a magnetic disk device of an embodiment.

FIG. 1 is a view showing a configuration of the magnetic disk device 100. The magnetic disk device 100 of FIG. 1, broadly divided, includes a hard disk controller 1 (below, abbreviated to HDC 1), a central processing unit 2 (below, abbreviated to CPU 2), a read-write channel 3 (below, abbreviated to R/W channel 3), a voice coil motor/spindle motor controller 4 (below, abbreviated to VCM/SPM controller 4), and a disk enclosure 5 (below, abbreviated to DE 5). In general, the HDC 1, the CPU 2, the R/W channel 3, and the VCM/SPM controller 4 are configured on the same board.

The HDC 1 includes a main controller 11 for controlling the whole HDC 1, a data format controller 12, an error correction encoding controller 13 (below, abbreviated to ECC controller 13), and a buffer RAM 14. The HDC 1 is connected to a host system via an interface unit, not shown in the figure, and, in addition, is connected to the DE 5, via the R/W channel 3, and transfers data between the host and the DE 5, by control of the main controller 11. A read reference clock (RRCK) generated by the R/W channel 3 is input to this HDC 1. The data format controller 12 converts data transferred from the host into a format suitable for recording on the disk media 50, and conversely, converts data reproduced from the disk media 50 into a format suitable for transferring to the host. The disk media 50 includes, for example, a magnetic disk. In order to enable correction of errors and detection of errors included in the data reproduced from the disk media 50, the ECC controller 13 adds redundant symbols, with recorded data as information symbols. Furthermore, the ECC controller 13 judges whether an error has occurred in the reproduced data, and when there is an error, correction or detection is carried out. However, the number of symbols that can correct errors is finite, and is related to length of redundant data. More specifically, since formatting efficiency deteriorates if much redundant data is added, there is a trade-off with the number of correctable symbols. In cases in which Reed-Solomon (RS) code is used as the ECC to perform error correction, up to (number of redundant symbols)/2 errors can be corrected. The buffer RAM 14 temporarily stores data transferred from the host, and transfers the data with suitable timing to the R/W channel 3. Conversely, the buffer RAM 14 temporarily stores read data transferred from the R/W channel 3, and after completion of the ECC decoding processing, transfers the data with suitable timing to the host.

The CPU 2 includes a flash ROM 21 (below, abbreviated as FROM 21), and a RAM 22, and is connected to the HDC 1, the R/W channel 3, the VCM/SPM controller 4, and the DE 5. An operational program of the CPU 2 is stored in the FROM 21.

The R/W channel 3 includes a write channel 31 and a read channel 32, and performs transfer of recorded data and reproduced data with the HDC 1. Furthermore, the R/W channel 3 is connected to the DE 5, and performs transmission of a recorded signal and receipt of a reproduced signal. Details are described below.

The VCM/SPM controller 4 controls a voice coil motor 52 (below, abbreviated to VCM 52) and a spindle motor 53 (below, abbreviated to SPM 53).

The DE 5 is connected to the R/W channel 3, and performs reception of a recorded signal and transmission of a reproduced signal. Furthermore, the DE 5 is connected to the VCM/SPM controller 4. The DE 5 includes the disk media 50, a head 51, the VCM 52, the SPM 53, and a preamplifier 54. In the magnetic disk device 100 of FIG. 1, it is assumed that there is one of the disk media 50, and that the head 51 is arranged on one side only of the disk media 50; however, the configuration may also have a plurality of disk media 50 arranged in a stack. Moreover, in general, the head 51 is arranged to correspond to each side of the disk media 50. The recorded signal transmitted by the R/W channel 3 is supplied via the preamplifier 54 inside the DE 5 to the head 51, and is recorded on the disk media 50 by the head 51. Conversely, a signal reproduced from the disk media 50 by the head 51 is transmitted via the preamplifier 54 to the R/W channel 3. In order to position the head 51 at a target position on the disk media 50, the VCM 52 inside the DE 5 moves the head 51 in a radial direction of the disk media 50. In addition, the SPM 53 rotates the disk media 50. In general, the HDC 1, the CPU 2, the R/W channel 3, and the VCM/SPM controller 4, the preamplifier 54 and the VCM 52 are implemented on the same semiconductor integrated circuit. However, an optional combination of a portion of these may also be implemented on the same semiconductor integrated circuit.

Figure 2:
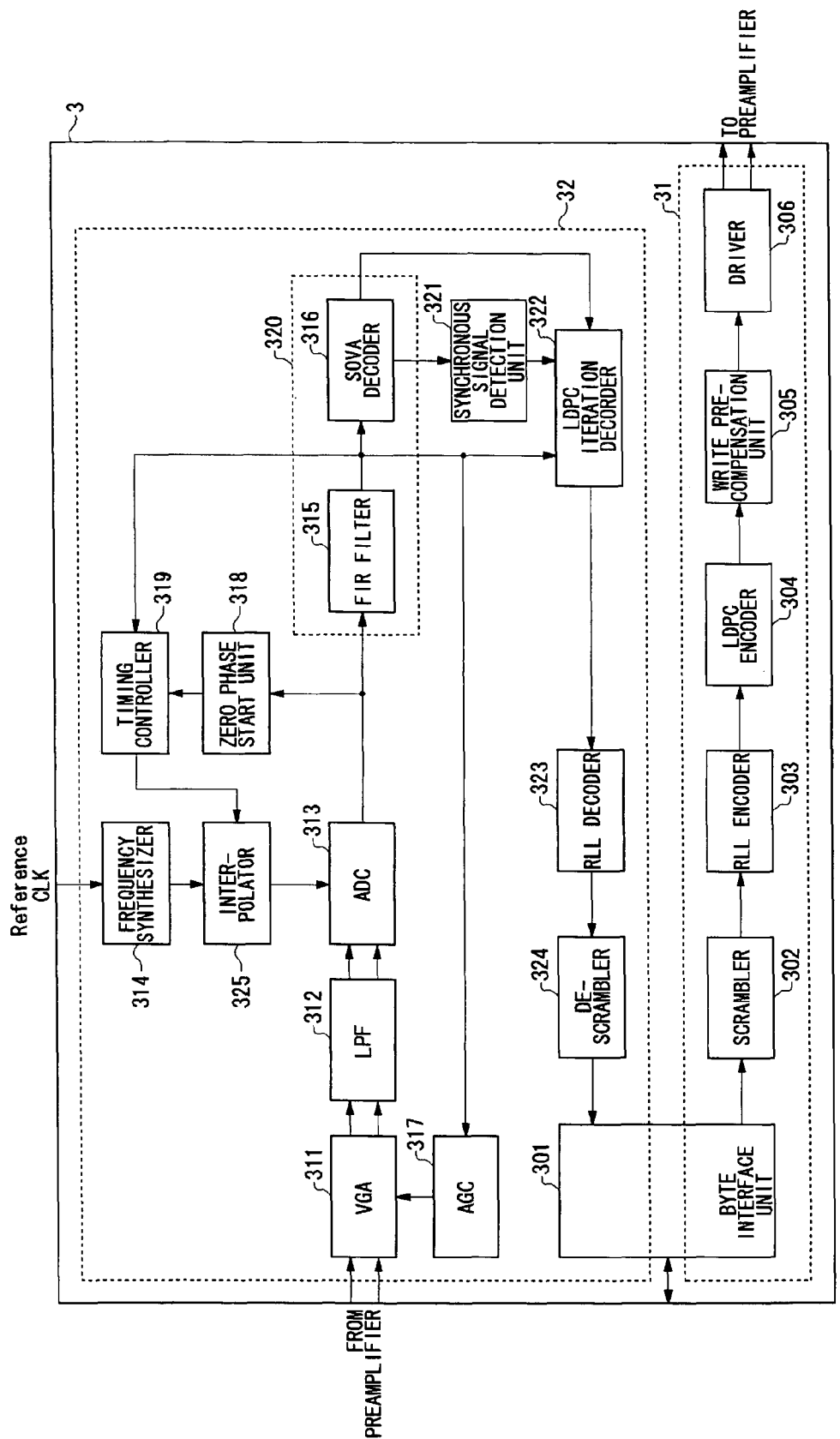
FIG. 2 is a view of a configuration of a read/write channel of the embodiment.

Here, the R/W channel 3 is explained, using FIG. 2. FIG. 2 shows a configuration of the R/W channel 3 of FIG. 1. The R/W channel 3 includes a write channel 31 and a read channel 32.

The write channel 31 includes a byte interface unit 301, a scrambler 302, a run-length control encoder 303 (below, abbreviated to RLL encoder 303), a low density parity check encoder 304 (below, abbreviated to a LDPC encoder 304), a write compensation unit 305 (below, described as a write pre-compensation unit 305), and a driver 306.

The byte interface unit 301 processes, as input data, data transferred from the HDC 1. Data writing on the media is input from the HDC 1 in one-sector units. At this time, not only user data for one sector (512 bytes), but also ECC bytes added by the HDC 1 are inputted at the same time. A data bus is usually one byte (8 bits), and processing is carried out for data input by the byte interface unit 301. The scrambler 302 converts write data into a random series. This is to prevent iteration of the same data pattern that adversely affects detection performance at read time and causes deterioration in error rate. The RLL encoder 303 has a role of limiting the maximum continuous length of 0s. By limiting the maximum continuous length of 0s, a data series is formed that is suitable for an automatic gain control unit 317 (below, abbreviated to AGC 317) or the like, at read time.

The LDPC encoder 304 has a role of encoding to a data series that is LDPC-encoded with redundant bits of LDPC code added to the data series. The LDPC encoding is performed by multiplying, from the left, a data series of length k, by a k×n matrix called a generated matrix. Each element included in this generated matrix is 0 or 1.

The write pre-compensation unit 305 is a circuit for compensating for non-linear distortion due to continuous magnetic transition on the media. A pattern necessary for compensation is detected from the write data, and a write electrical current waveform is adjusted in advance so that the magnetic transition occurs at a correct position. The driver 306 is a driver for outputting a signal corresponding to a pseudo ECL level. Output from the driver 306 is sent to the DE 5, not illustrated in the figure, and sent through the pre-amplifier 54 to the head 51, and the write data is recorded on the disk media 50.

The read channel 32 is configured from a variable gain amplifier 311 (below, abbreviated to VGA 311), a low-pass filter 312 (below, abbreviated to LPF 312), the AGC 317, an analog/digital converter 313 (below, abbreviated to ADC 313), a frequency synthesizer 314, a FIR filter 315, a SOVA (Soft-Output Viterbi Algorithm) decoder 316, an LDPC iteration decoder 322, a synchronous signal detector 321, a run-length control decoder 323 (below, abbreviated to RLL decoder 323), and a de-scrambler 324.

The VGA 311 and the AGC 317 perform adjustment of the amplitude of a read waveform of data send from the preamplifier 54, not shown in the figure. The AGC 317 compares the actual amplitude with an ideal amplitude, and determines gain to be set in the VGA 311. The LPF 312 can adjust cutoff frequency and boost amount, and handles part of equalization of partial response waveform (below, abbreviated to PR) and reduction of high frequency wave noise. In the LPF 312, equalization of the PR waveform is carried out, but complete equalization by analog LPF is difficult due to many causes, such as variation in rising of the head, non-uniformity of media, variation in rotation of motor, and the like. Accordingly, the FIR filter 315, that is disposed to the rear and has more flexibility, is used, and the equalization of the PR waveform is repeated. The FIR filter 315 may also have a function of adaptively adjusting a tap coefficient thereof. The frequency synthesizer 314 generates a sampling clock for the ADC 313. The interpolator 325 uses a phase error detected by a timing controller 319, to perform fine adjustment of the sampling clock generated by the frequency synthesizer 314. The ADC 313 has a configuration to obtain a direct synchronous sample by AD conversion. In addition to this configuration, the configuration may obtain an asynchronous sample by the AD conversion. In such cases, an interpolation filter may be used instead of the interpolator 325. A zero phase start unit 318 is a block for determining an initial phase. The timing controller 319 uses output of the determined initial phase and the FIR filter 315, compares the actual sample value with an ideal sample value, and detects phase error.

The SOVA decoder 316 uses SOVA, which is a type of Viterbi algorithm, to avoid deterioration of decoding characteristic that accompanies inter-symbol interference. That is, with the increase in recording density of magnetic disk devices in recent years, interference between recorded symbols has increased, and in order to solve the problem of deterioration of decoding characteristic, a maximum-likelihood decoding (Partial Response Maximum Likelihood; abbreviated to PRML below) system is used as a system to overcome this. The PRML system is composed of two systems, a PR system and an ML system, and is a system for obtaining a signal series that maximizes likelihood of a partial response due to inter-symbol interference of reproduced signals. As shown in FIG. 2, a PRML decoder 320 includes the FIR filter 315 and the SOVA decoder 316. Output from the SOVA decoder 316 can be used as a soft decision input value of the LDPC iteration decoder 322. For example, soft decision values (0.71, 0.18, 0.45, 0.45, 0.9) are the output of the SOVA. These values express, as a numerical value, the probably of 0 being large, or a probability of 1 being large. For example, the first value of 0.71 indicates that the probability of 1 is large, and the fourth value of 0.45 means that the probability of 0 is large but the probability of 1 is also not small. Output of a conventional Viterbi detector is a hard decision value, and is a hard decision of the SOVA output. In the case of the above mentioned example, this is (1, 0, 0, 0, 1). The hard decision value is only expressed as being 0, or as being 1, and information indicating which has a higher probability is lost. As a result, with input of the soft decision value to the LDPC iteration decoder 322, decoding performance is better.

The LDPC iteration decoder 322 has a role of decoding from the data series that is LDPC-encoded, to a series before the LDPC encoding. Methods of decoding include, principally, a sum-product decoding method, and a min-sum decoding method, and in an aspect of decoding performance, the sum-product decoding method is advantageous, but the min-sum decoding method has a characteristic in being easy to implement with hardware.

In general, when using iteration decoding in LDPC decoding, values known as a priori probability and a posteriori probability are obtained, and in addition, the priori probability and the posteriori probability are recalculated, via the DAE. At a prescribed number of iterations, or when it is judged that an error is no longer included, a hard decision is made of the likelihood at that point in time, and decoded data of two values are output. The non-inclusion of an error means that a transposed matrix of the check matrix is multiplied by decoded data including a redundant data series, and a judgment is made as to whether or not the result is a 0 matrix. If the generated matrix is G and the check matrix is H, a matrix is obtained such that $GH^T=0$. As described above, the LDPC coding is formed by multiplying the data series from the left, by the generated matrix, and adding a redundant bit to the data series. That is, if the result of multiplying the transposed matrix of the check matrix by the decoded data is a 0 matrix, it is judged that due to corrections there is no error in the decoded data, and, in addition, if the result is not a 0 matrix, it is judged that an error that has not been corrected is included in the decoded data. As another method of judging that other errors are not included, among the data that is an object of decoding, the generated matrix used in LDPC encoding is multiplied by the data series outside of the redundant data series, to obtain the redundant bits. Next, a hard decision of the redundant bits is made, a comparison with the redundant data series is done, and according to whether or not there is a match, a judgment is made as to whether the errors have been corrected. Here the hard decision means, for example, that the judgment is "1" in cases where it is larger than a prescribed threshold, and is "0" in cases where it is smaller.

The synchronous signal detection unit 321 detects a synchronous signal (sync mark) added to the head of the data, and has a role of recognizing the head position of the data. The RLL decoder 323 performs an operation the reverse of the RLL encoder 303 of the write channel 31, on data outputted from the LDPC iteration decoder 322, to return the original data series. The de-scrambler 324 performs an operation the reverse of the scrambler 302 of the write channel 31, to return the original data series. The data generated here is transmitted to the HDC 1.

Figure 3:
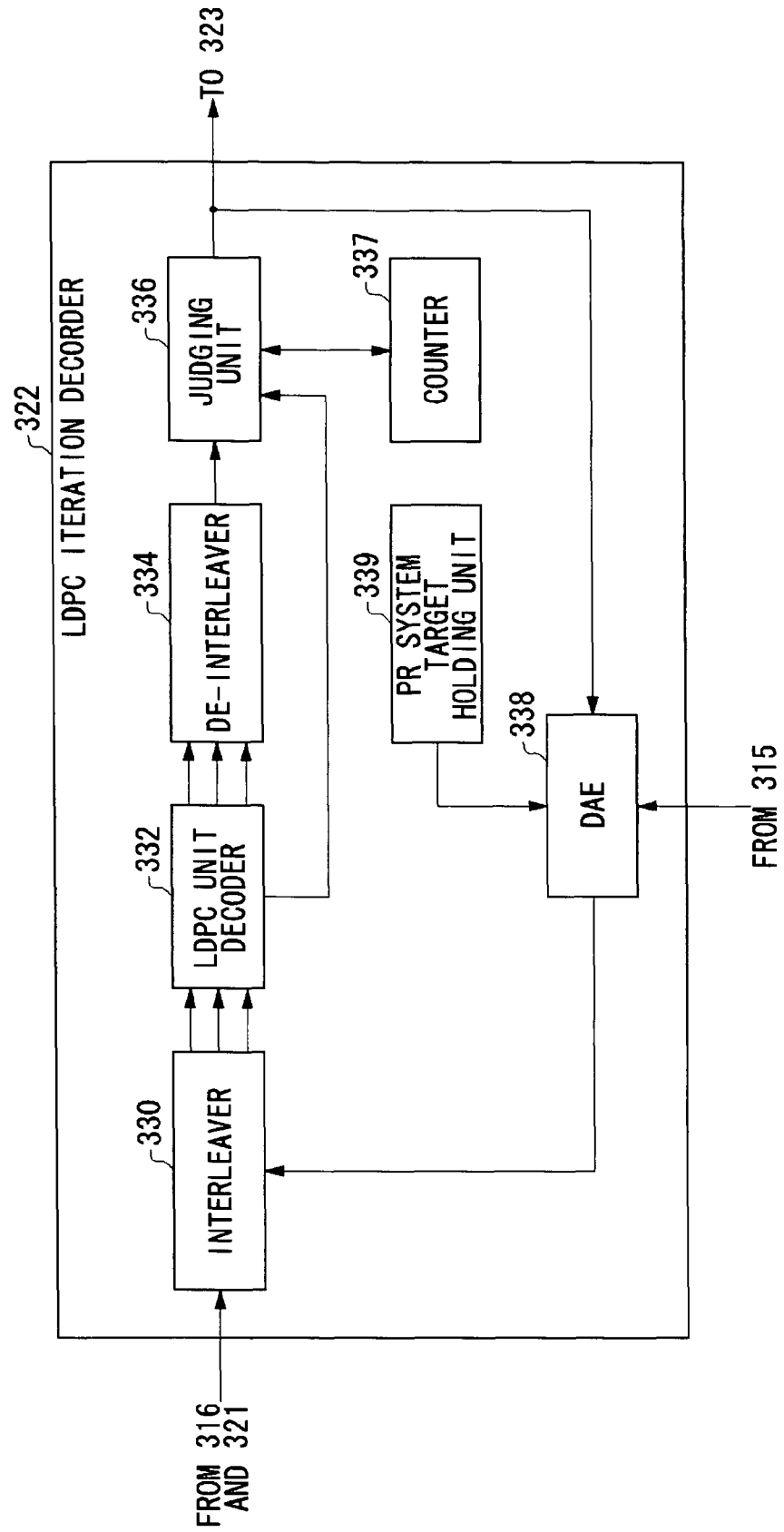
FIG. 3 is a functional block diagram of an LDPC iteration decoder of the embodiment.

FIG. 3 is a functional block diagram of the LDPC iteration decoder 322. The LDPC iteration decoder 322 includes an interleaver 330, an LDPC unit decoder 332, a de-interleaver 334, a judging unit 336, a counter 337, the DAE 338, and a PR system target holding unit 339.

The soft decision value data decoded by the SOVA decoder 316 and outputted is inputted to the interleaver 330 after the head position of the data is recognized by the synchronous signal detector 321. The interleaver 330 interleaves the inputted data, to divide it into a plurality of paths.

Operation of the interleaver 330 is explained here. In general, in the PRML system, it is known that burst errors easily occur. When the LDPC unit decoder 332 applies the check matrix to the data series, if a column having a linearly dependent relationship is multiplied by the check matrix at positions at which burst errors occur in the data series, there are cases in which these burst errors cannot be detected. In particular, for elements of the check matrix used in the LDPC decoding, since the number of is is small in comparison to the number of 0s, columns having linearly dependent relationships are easily included, and the probability that burst errors cannot be detected is relatively high. By dividing the data into the plurality of paths, the interleaver 330 disperses the errors to various paths, and the accuracy of error detection is raised, when multiplication by the check matrix is done. Here, "interleaving" is sorting continuous data of a data series into a plurality of stages. A "burst error" is a continuously generated error in the data series.

The LDPC unit decoder 332 performs LDPC decoding on data divided into a plurality of paths by the interleaver 330, and together with outputting the decoded data as temporary estimated values, performs a parity check on the temporary estimated values. Here, the LDPC unit decoder 332 makes a hard decision of soft decision values inputted in a first decoding, and outputs the temporary estimated values as hard decision values. If the temporary estimated values are taken as x and the check matrix as H, a "parity check" multiplies the temporary estimated values x by the transposed matrix HT of the check matrix H, and examines whether or not the relationship xHT=0 is true. By performing parallel processing on data divided into a plurality of paths by the interleaver 330, the LDPC unit decoder 332 realizes high speed processing. The de-interleaver 334 de-interleaves the temporary estimated values decoded by the LDPC unit decoder 332 and outputted, and returns them to a form of one of the original data series. In FIG. 3, the plurality of paths between the interleaver 330 and the LDPC unit decoder 332, and between the LDPC unit decoder 332 and the de-interleaver 334, are shown by three arrows. Here, "de-interleaving" means integrating data interleaved and sorted into the plurality of paths, and rearranging into an original format.

The judging unit 336 judges whether or not iteration decoding is finished, according to a result of the parity check. The counter 337 counts the number of times that decoding has been repeated. That is, 1 is added to the counter 337 every time the judging unit 336 makes a judgment. Here, when xHT=0 is realized for the result of the parity check, or when xHT=0 is not realized but the counter 337 has counted to a number of decoding iterations decided in advance (also described as a "prescribed number of times"), the judging unit 336 judges that the iteration decoding is finished. On the other hand, when xHT=0 is not realized for the result of the parity check, and the counter 337 has not counted to the prescribed number of times, the judging unit 336 judges that the iteration decoding has not finished. When it has judged that the iteration decoding has finished, the judging unit 336 outputs the temporary estimated values to the RLL decoding unit 323. On the other hand, when it is not judged that the iteration decoding has finished, the judging unit 336 outputs the temporary estimated values to the DAE 338. That is, the judging unit 336 does not add processing to the temporary estimated values de-interleaved by the de-interleaver 334, but outputs these temporary estimated values to the RLL decoding unit 323 or the DAE 338. The DAE 338 uses the de-interleaved temporary estimated values, the output of the FIR filter 315, and a target value (also described as a "PR system target") of a waveform equalization of data by the PR system that the PR system target holding unit 339 holds, to compute a logarithm likelihood ratio. Here, the "logarithm likelihood ratio" is reliability information for temporary estimated value symbols. In the present embodiment, the temporary estimated values used at this time are hard decision values, but may also be soft decision values before a hard decision.

Computation of the logarithm likelihood ratio for the DAE 338 is computed according to Equation 1 below. Here $\lambda k$ is the logarithm likelihood ratio, $(x_{k-\mu}, \Lambda, x_k, \Lambda, x_{k+\mu})$ are temporary estimated values, $(y_k, \Lambda, y_{k+\mu})$ are output of the FIR filter 315, $(g_0, g_1, \Lambda, g_\mu)$ are PR system targets, $\sigma^2$ is noise variance, and $\mu$ is an order of the PR system. Furthermore, $P(y_k, \Lambda, y_{k+\mu}|x_k=1, x_{k-\mu}, \Lambda, x_k, \Lambda, x_{k+\mu})$ indicates a probability of $y_k, \Lambda, y_{k+\mu}$ when $x_k=1, x_{k-\mu}, \Lambda, x_k, \Lambda, x_{k+\mu}$. Furthermore, $P(y_k, \Lambda, y_{k+\mu}|x_k=0, x_{k-\mu}, \Lambda, x_k, \Lambda, x_{k+\mu})$ indicates a probability of $y_k, \Lambda, y_{k+\mu}$ when $x_k=0, x_{k-\mu}, \Lambda, x_k$, and $x_{k+\mu}$. In the explanation below, the logarithm likelihood ratio is described as $\lambda$, the temporary estimated value as x, the output of the FIR filter 315 as y, and the PR system target as g.

$$\lambda_k = l_n \frac{P(y_k, \Lambda, y_{k+\mu} | x_k = 0, x_{k-\mu}, \Lambda, x_k, \Lambda, x_{k+\mu})}{P(y_k, \Lambda, y_{k+\mu} | x_k = 1, x_{k-\mu}, \Lambda, x_k, \Lambda, x_{k+\mu})} \quad \text{Equation 1}$$

$$= \frac{2}{\sigma^2} \sum_{i=k}^{k+\mu} g_{i-k} \left( y_i - \sum_{j=0, j \neq i-k}^{\mu} g_j x_{i-j} \right).$$

Here, the realization of Equation 2, below, is focused upon.

$$\sum_{j=0, j \neq i-k}^{\mu} g_j x_{i-j} = \left( \sum_{j=0}^{\mu} g_j x_{i-j} \right) - g_{i-k} x_k.$$

Equation 2

If Equation 2 is substituted into Equation 1, Equation 3 is obtained with regard to λk.

$$\lambda_k = \frac{2}{\sigma^2} \sum_{i=k}^{k+\mu} g_{i-k} \left( g_{i-k} x_k + y_i - \sum_{j=0}^{\mu} g_j x_{i-j} \right)$$

$$= \frac{2}{\sigma^2} \left[ g_0 \left( g_0 x_k + y_k - \sum_{j=0}^{\mu} g_j x_{k-j} \right) + \right.$$

$$g_1 \left( g_1 x_k + y_{k+1} - \underline{\sum_{j=0}^{\mu} g_j x_{k+1-j}} \right) + $$
$$\phantom{g_1 \left( g_1 x_k + y_{k+1} - \right.} (1)$$

$$g_2 \left( g_2 x_k + y_{k+2} - \underline{\sum_{j=0}^{\mu} g_j x_{k+2-j}} \right)$$
$$\phantom{g_2 \left( g_2 x_k + y_{k+2} - \right.} (2)$$

$$\vdots$$

$$\left. g_\mu \left( g_\mu x_k + y_{k+\mu} - \underline{\sum_{j=0}^{\mu} g_j x_{k+\mu-j}} \right) \right].$$
$$\phantom{g_\mu \left( g_\mu x_k + y_{k+\mu} - \right.} (3)$$

Equation 3

In addition, λk+1 is obtained by Equation 4, below.

$$\lambda_{k+1} = \frac{2}{\sigma^2} \sum_{i=k+1}^{k+1+\mu} g_{i-k-1} \left( g_{i-k-1} x_{k+1} + y_i - \sum_{j=0}^{\mu} g_j x_{i-j} \right)$$

$$\frac{2}{\sigma^2} \left[ g_0 \left( g_0 x_{k+1} + y_{k+1} - \underline{\sum_{j=0}^{\mu} g_j x_{k+1-j}} \right) + \right.$$
$$\phantom{\frac{2}{\sigma^2} \left[ g_0 \right.} (1)$$

$$g_1 \left( g_1 x_{k+1} + y_{k+2} - \underline{\sum_{j=0}^{\mu} g_j x_{k+2-j}} \right) + $$
$$\phantom{g_1 \left(\right.} (2)$$

$$\vdots$$

$$g_{\mu-1} \left( g_{\mu-1} x_{k+1} + y_{k+\mu} - \underline{\sum_{j=0}^{\mu} g_j x_{k+\mu-j}} \right) + $$
$$\phantom{g_{\mu-1}\left(\right.} (3)$$

$$\left. g_\mu \left( g_\mu x_{k+1} + y_{k+1+\mu} - \sum_{j=0}^{\mu} g_j x_{k+1+\mu-j} \right) \right].$$

Equation 4

Here, if Equations 3 and 4 are compared, underlined portions of both equations are the same, and are common to Equations 3 and 4. Here, numbers attached to the underlined portions show corresponding relationships of respective common portions. Furthermore, here, only three numbers, (1), (2), and (3) are shown at the underlined portions; however, in actuality, for all items not written in Equations 3 and 4, there are portions that are common to Equations 3 and 4. In the computational expression of continuous λ, a plurality of common portions appear in this way. With regard to adjacent λ, there are μ common portions. Furthermore, common portions of continuous λ appear out of alignment, each by one item. That is, with regard to the common portions in respective expanded λ equations, λk−μ, Λ, λk−2, λk−1, λk, λk+1, λk+2, Λ, λk+μ, there are μ places for λk and λk−1, and λk and λk+1, there are μ−1 places for λk and λk−2, and λk and λk+2, and there is one place for λk and λk−μ, and λk and λk+μ.

As a specific example, λ4 and λ5 will be explained. For μ=4, computational expressions for λ4 and λ5 are computed by Equation 5 and Equation 6 below.

$$\lambda_4 = \frac{2}{\sigma^2} \left[ g_0 \left( g_0 x_4 + y_4 - \sum_{j=0}^{4} g_j x_{4-j} \right) + \right.$$

$$g_1 \left( g_1 x_4 + y_5 - \underline{\sum_{j=0}^{4} g_j x_{5-j}} \right) + $$
$$(1)$$

$$g_2 \left( g_2 x_4 + y_6 - \underline{\sum_{j=0}^{4} g_j x_{6-j}} \right) + $$
$$(2)$$

$$g_3 \left( g_3 x_4 + y_7 - \underline{\sum_{j=0}^{4} g_j x_{7-j}} \right) + $$
$$(3)$$

$$\left. g_4 \left( g_4 x_4 + y_8 - \underline{\sum_{j=0}^{4} g_j x_{8-j}} \right) \right].$$
$$(4)$$

Equation 5

$$\lambda_5 = \frac{2}{\sigma^2} \left[ g_0 \left( g_0 x_5 + y_5 - \underline{\sum_{j=0}^{4} g_j x_{5-j}} \right) + \right.$$
$$(1)$$

$$g_1 \left( g_1 x_5 + y_6 - \underline{\sum_{j=0}^{4} g_j x_{6-j}} \right) + $$
$$(2)$$

$$g_2 \left( g_2 x_5 + y_7 - \underline{\sum_{j=0}^{4} g_j x_{7-j}} \right) + $$
$$(3)$$

$$g_3 \left( g_3 x_5 + y_8 - \underline{\sum_{j=0}^{4} g_j x_{8-j}} \right) + $$
$$(4)$$

$$\left. g_4 \left( g_4 x_5 + y_9 - \sum_{j=0}^{4} g_j x_{9-j} \right) \right].$$

Equation 6

Underlined portions of Equations 5 and 6 are the same. The underlined portions with the same attached numbers are respectively common in these expressions. That is, when μ=4, the expanded expressions of λ are composed of five items, and common portions appear in four items in expanded expressions of adjacent λs, as in, for example, λ4 and λ5. Here, although not shown as an equation, for example, there are common portions at 3 places in λ3 and λ5, two places in λ2 and λ5, and one place in λ1 and λ5.

A circuit to which Equation 1 applies is implemented in the DAE 338. In this regard, for circuits computing each λ, circuits corresponding to common portions appearing in each item of the expanded expressions of λ can be shared. By sharing these circuits, the circuit scale can be reduced.

Implementation of circuits of the DAE will be explained. Below, explanations of a specific example are given using FIGS. 4, 5, 6, 7, and 8. Here it is assumed that μ=4.

Figure 4:
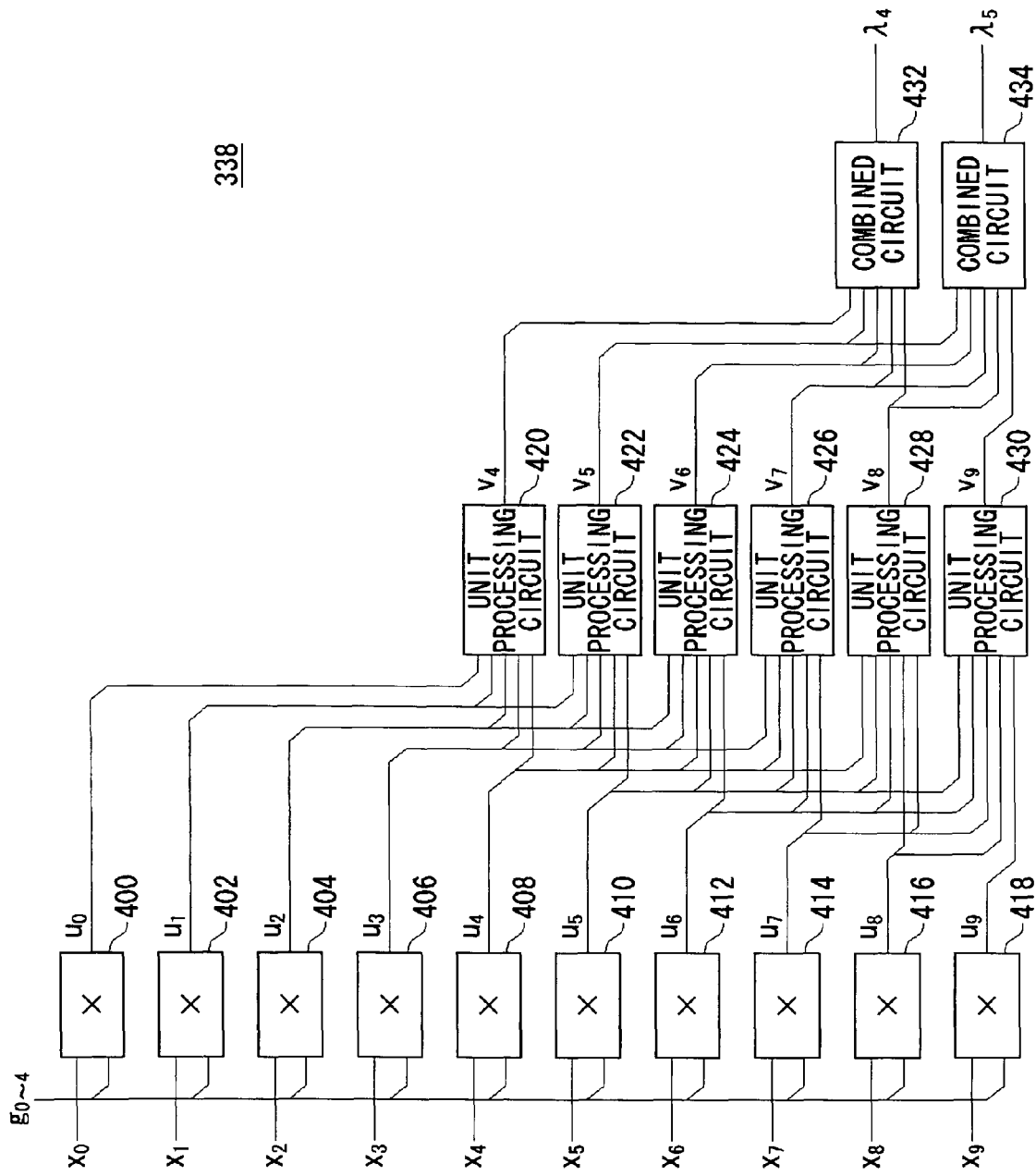
FIG. 4 is a circuit diagram showing an outline of part of a DAE of the embodiment.

FIG. 4 is a circuit diagram showing an outline of part of the DAE. The same figure shows portions related to computation of λ4 and λ5 inside the DAE 338.

The DAE 338 includes the first multipliers 400, 402, 404, 406, 408, 410, 412, 414, 416, and 418, the unit processing circuits 420, 422, 424, 426, 428, and 430, and the combined circuits 432 and 434. The first multipliers 400 to 418 multiply, respectively, temporary estimated values x inputted from the judging unit 336, and a plurality of PR system targets g held by the PR system target holding unit 339, and compute signals u0 to u9. The unit processing circuits 420 to 430 perform computations described below using FIG. 6 and FIG. 7 on the signals u0 to u9 that are multiplication results of the first multipliers 400 to 418, to compute signals v4 to v9. Below, when there is no need to distinguish between each of the signals u0 to u9, and the signals v4 to v9, both "u" and "v" are used in descriptions.

The combined circuits 432 and 434 perform computations, described below using FIG. 8, on the signals v outputted from the unit processing circuits 420 to 430, to compute the logarithm likelihood ratio λ.

As an example, an explanation is given concerning computation of λ4 and λ5 using FIG. 4. In the computation of λ4, x0 to x8 are used. Each of the first multipliers 400 to 416 multiply each x by g0, g1, g2, g3, and g4, respectively. Respective computational results u0 to u8 are outputted from the first multipliers 400 to 416. The unit processing circuits 420 to 428 use signals included in u0 to u8, to compute, respectively, v4 to v8. The combined circuit 432 uses v4 to v8 to compute λ4. x1 to x9 are used in computation of λ5. Each of the first multipliers 402 to 418 multiply each x by g0, g1, g2, g3, and g4, respectively, and compute u1 to u9. The unit processing circuits 422 to 430 use signals included in u1 to u9, to respectively compute v5 to v9. The combined circuit 434 uses v5 to v9, to compute λ5. In this way, λ5 uses a signal that has a portion in common with λ4, and performs computation according to a procedure the same as for computation of λ4.

Figure 5:
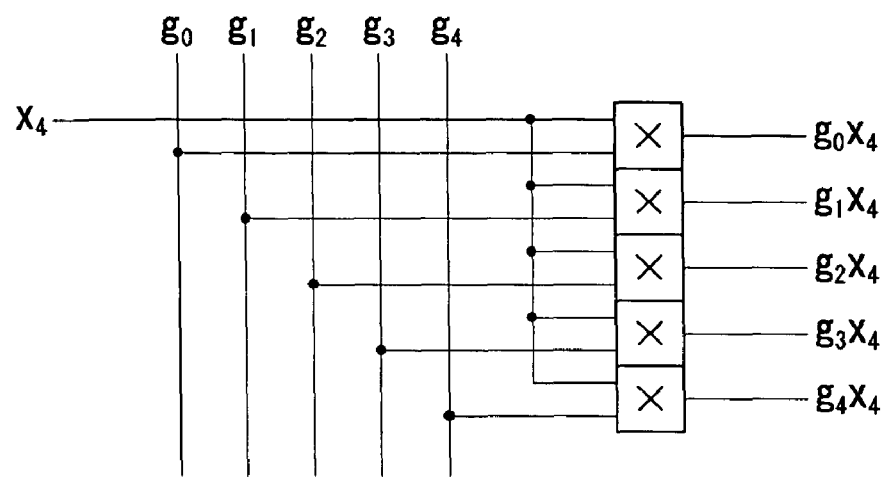
FIG. 5 is a circuit diagram of a first multiplier of the embodiment.

Furthermore, although not shown in the figure since there is no relation with the computation of λ4 and λ5, v0 to v4 are also computed in the same way as v5 to v9.

u, which is computed respectively by the first multipliers 400 to 418, is described by an expression $u_p = g_j x p(p:k-\mu, \Lambda, k, \Lambda, k+\mu, j:0\sim\mu)$. Here, u is a generic term for u0 to u9. FIG. 5 is a circuit diagram of the first multiplier 408. The first multiplier 408 multiplies x4, which is inputted, by, respectively, g0, g1, g2, g3, and g4, and outputs, as u4, five signals, g0x4, g1x4, g2x4, g3x4, and g4x4.

The unit processing circuits 420 to 430 use signals including u outputted from the first multipliers 400 to 418, in totality, to compute v. v is computed according to Equation 7 below.

$$v_q = g_r \left( g_r x_{q-r} + y_q - \sum_{j=0}^{\mu} g_j x_{q-j} \right)$$ Equation 7

$q: k, \ldots, k+\mu$ $r: 0, \ldots, \mu.$

Below, a first item in parentheses in Equation 7 is generically described as "gx", and a third item is generically described as "Σgx".

Specifically, the unit processing circuits 420 to 430 perform addition on a plurality of signals included in u, compute Σgx, and subtract the result from y. This computed result (y−Σgx) and each of the plurality of signals included in the u referred to above, are added, and this computed result is multiplied by g0 and g4 respectively. Each of the unit processing circuits 420 to 430 output these computed results as v. That is, v includes a plurality of signals.

Figure 6:
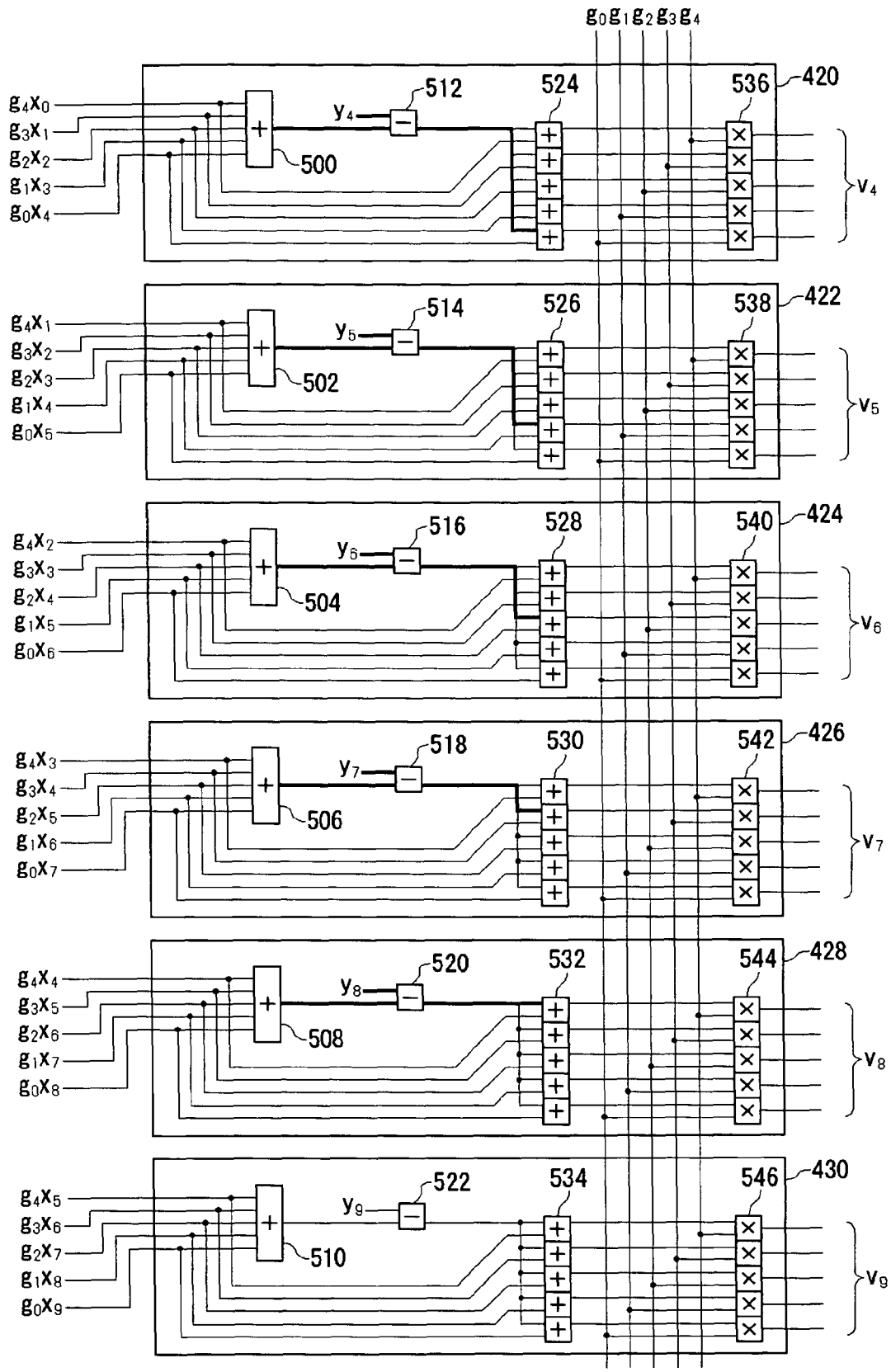
FIG. 6 is a diagram showing a unit processing circuit related to computation of a logarithm likelihood ratio $\lambda 4$ of the embodiment.

FIG. 6 is a circuit diagram of the unit processing circuits 420 to 430. As shown in the same figure, the unit processing circuits 420 to 430 each include first adders, 500, 502, 504, 506, 508, 510, subtractors 512, 514, 516, 518, 520, 522, second adders 524, 526, 528, 530, 532, 534, and second multipliers 536, 538, 540, 542, 544, 546.

An explanation will be given concerning signal processing by the unit processing circuits. For example, among signals included in output u from the first multipliers 400 to 408, g4x0, g3x1, g2x2, g1x3, and g0x4 are inputted to the unit processing circuit 420. The first adder 500 performs addition on these five signals to compute Σgjx4−j (j=0~4). The subtractor 512 subtracts output of the first adder 500 from y4, to compute y4−Σgjx4−j (j=0~4). The second adder 524 adds output of the subtractor 512 and each of signals g4x0, g3x1, g2x2, g1x3, and g0x4, which are inputted to the unit processing circuit 420, to compute g4x0+y4−Σgjx4−j, g3x1+y4−Σgjx4−j, g2x2+y4−Σgjx4−j, g1x3+y4−Σgjx4−j, and g0x4+y4−Σgjx4−j (j=0~4). The second multiplier 536 multiplies each signal outputted from the second adder 524 by g0 to g4, respectively. The results g4(g4x0+y4−Σgjx4−j), g3(g3x1+y4−Σgjx4−j), g2(g2x2+y4−Σgjx4−j), g1(g1x3+y4−Σgjx4−j), and g0(g0x4+y4−Σgjx4−j) (j=0~4) are computed, and these computed results are outputted from the unit processing circuit 420 as v4. For other unit processing circuits 422 to 430, v5 to v9 are computed according to a similar procedure.

Output signals of the unit processing circuits 420 to 428 are related to computation of λ4. Furthermore, although five signals are respectively included in v4 to v8 that are outputted from each of these unit processing circuits, one signal from among these five signals, with regard to each of the unit processing circuits 420 to 428, is used in computing λ4. That is, the computation of λ4, for example, uses g0(g0x4+y4−Σgjx4−j) among output of the unit processing circuit 420, g1(g1x4+y5−Σgjx5−j) among output of the unit processing circuit 422, g2(g2x4+y6−Σgjx6−j) among output of the unit processing circuit 424, g3(g3x4+y7−Σgjx7−1) among output of the unit processing circuit 426, and g4 (g4x4+y8−Σgjx8−j) among output of the unit processing circuit 428. Here, j=0 to 4.

On the other hand, output signals of the unit processing circuits 422 to 430 are related to computation of λ5. Furthermore, the computation of λ5 uses g0(g0x5+y5−Σgjx5−j) among output of the unit processing circuit 422, g1(g1x5+y6−Σgjx6−j) among output of the unit processing circuit 424, g2(g2x5+y7−Σgjx7−j) among output of the unit processing circuit 426, g3(g3x5+y8−Σgjx8−j) among output of the unit processing circuit 428, and g4 (g4x5+y9−Σgjx9 j) among output of the unit processing circuit 430. Here, j=0 to 4.

Figure 7:
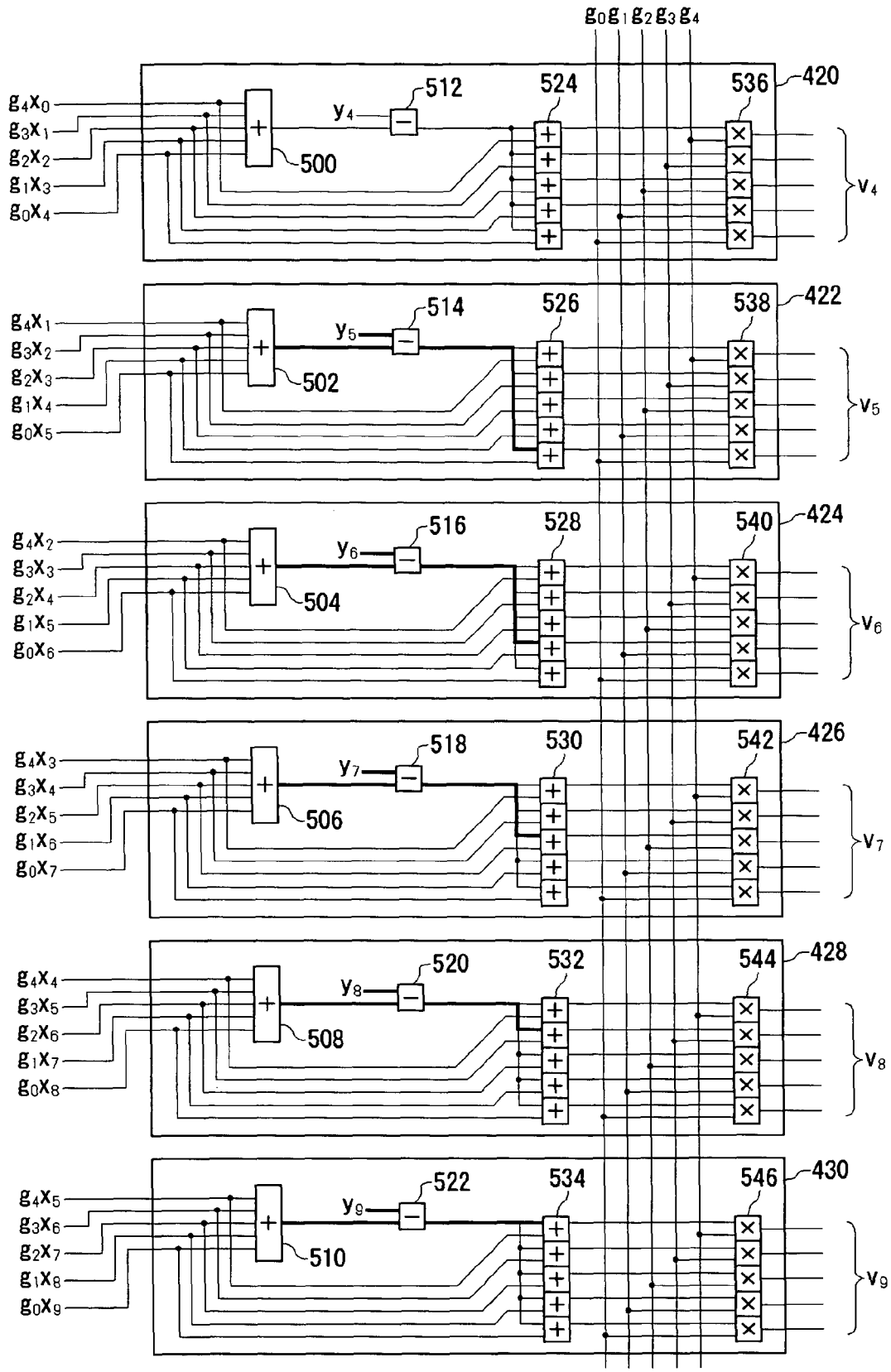
FIG. 7 is a diagram showing the unit processing circuit related to computation of a logarithm likelihood ratio $\lambda 5$ of the embodiment.

In FIG. 6, signal paths related to computation of λ4 between the first adders 500 to 508, and the second adders 524 to 532 of each unit processing circuit are shown by thick lines. In FIG. 7, signal paths related to computation of λ5 between the first adders 502 to 510, and the second adders 526 to 534 of each unit processing circuit are shown by thick lines. If positions of the thick lines in FIG. 6 and FIG. 7 are compared, the positions of the thick lines coincide for four of the unit processing circuits 422, 424, 426, and 428, and circuits corresponding to these coinciding thick lines are shared in the computation of $\lambda 4$ and $\lambda 5$.

An explanation of the sharing of the circuits related to computation of $\lambda 4$ and $\lambda 5$ has been given using FIG. 6 and FIG. 7, there is no limitation thereto, and sharing of circuits between continuous $\lambda$s is possible. As described above, items shared between respective expanded expressions of respective continuous $\lambda$s are out of alignment, each by one item. For example, for cases of $\mu=4$, with regard to $\lambda 0$ to $\lambda 8$, $\lambda 4$ is focused upon. If the expanded expression of $\lambda 4$ is compared with the expanded expressions of $\lambda 3$ and $\lambda 5$, common portions appear at four places. If the expanded expression of $\lambda 4$ is compared with the expanded expressions of $\lambda 2$ and $\lambda 6$, common portions appear at three places. If the expanded expression of $\lambda 4$ is compared with the expanded expressions of $\lambda 1$ and $\lambda 7$, common portions appear at two places. If the expanded expression of $\lambda 4$ is compared with the expanded expressions of $\lambda 0$ and $\lambda 8$, common portions appear at one place. There is no limitation to $\lambda 4$, and for cases in which other $\lambda$s are focused upon, common portions exist in the same way.

If circuits related to the common portions are shared, it is sufficient to provide five circuits corresponding to the common portions with respect to five items of the expanded expression of $\lambda 0$, and, with regard to each of the expanded expressions $\lambda 1$ to $\lambda 8$, one circuit corresponding to one item for which there is no portion that is in common with the expanded expression one $\lambda$ before the present one. Here, "one $\lambda$ before" means, with respect to $\lambda 4$ for example, $\lambda 3$. A total of 13 circuits have to be provided. By the sharing of the circuits, compared to conventional cases where a total of 45 circuits corresponding to each item of $\lambda 0$ to $\lambda 8$ are necessary, the circuit scale can be greatly reduced. Furthermore, focusing on the expanded expressions of each of $\lambda 1$ to $\lambda 8$, compared to conventional cases where five circuits corresponding to each item of the expanded expressions have to be provided, by the sharing of the circuits, it is sufficient to provide one circuit. Accordingly, with regard to the expanded expressions of each of $\lambda 1$ to $\lambda 8$, the number of circuits can be reduced to ⅕.

Here, an explanation was given with an example in which $\mu=4$. However, in general, with respect to $\lambda k-\mu+1 \sim \lambda k+\mu$, by the sharing of the circuits the number of circuits of portions between the first adder and the second adder of each unit processing circuit can be reduced to $1/(\mu+1)$.

By the sharing of the circuits, the circuit scale can be reduced in the DAE 338. Furthermore, by the reduction in the circuit scale, speed of signal processing in the DAE 338 can be raised. Moreover, accompanying the reduction in the circuit scale, it becomes possible to reduce costs.

Each combined circuit computes $\lambda$ using a part of output of the unit processing circuits. Each combined circuit includes a third adder and a third multiplier. The third adder performs addition on a part of output of the unit processing circuits. The third multiplier multiplies output of the third adder by $2/\sigma 2$, and computes $\lambda$.

Figure 8:
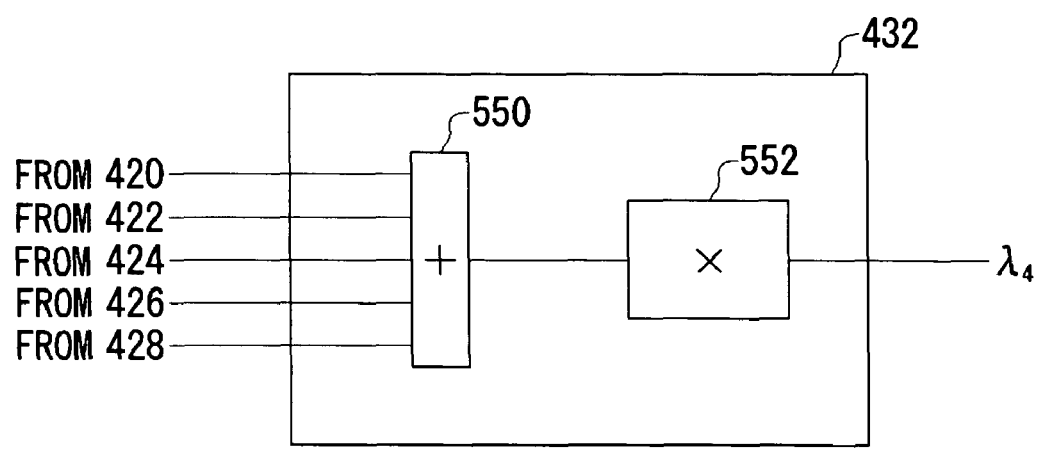
FIG. 8 is a circuit diagram of a combined circuit of the embodiment.

FIG. 8 is a circuit diagram of the combined circuit 432. An explanation will be given, as an example, of computation of $\lambda 4$, using the same figure. From the unit processing circuit 420, g0 (g0x4+y4−Σgjx4−j), from the unit processing circuit 422, g1 (g1x4+y5−Σgjx5−j), from the unit processing circuit 424, g2 (g2x4+y6−Σgjx6−j), from the unit processing circuit 426, g3 (g3x4+y7−Σgjx7−j), and from the unit processing circuit 428, g4(g4x4+y8−Σgjx8−j) are input to the combined circuit 432. The third adder 550 performs addition on these five signals. The third multiplier multiplies the computed result of the third adder by $2/\sigma 2$, to compute $\lambda 4$.

In the present embodiment, the unit processing circuits 420 to 430 have the first adders 500 to 510, the subtractors 512 to 522, the second adders 524 to 534, and the second multipliers 536 to 546, but may have only the first adders 500 to 510, or may have only the subtractors 512 to 522. In addition, the unit processing circuits may have the first adders 500 to 510, and the subtractors 512 to 522.

In the present embodiment, an explanation has been given of an example in which a signal processing apparatus related to the present invention is applied to LDPC decoding. The invention is not limited thereto, and the signal processing apparatus related to the present invention can be applied to decoding of signals encoded using the DAE and to detection of signals.

In the present embodiment, an explanation has been given of an example in which the signal processing apparatus related to the present invention is applied to a magnetic disk device. The invention is not limited thereto, and the signal processing apparatus related to the present invention can be applied to a device for decoding an encoded signal when a signal is read, or detection of a signal, for a storage apparatus such as an optical disk storage device, an opto-magnetic disk storage device, or the like. In addition, the invention can be applied to a device for decoding an encoded signal when received, or detection of a signal, for a communication system.

What is claimed is:

1. A signal processing apparatus for applying prescribed processing to an input signal series and computing a logarithm likelihood ratio, the apparatus comprising:

plural unit processing circuits for executing unit processing of a part of the prescribed processing, for, respectively, signals to be processed, belonging to the input signal series, that are now about to undergo the prescribed processing, and to a prescribed number of signals related to the signals to be processed; and a combined circuit for integrating output of the plural unit processing circuits, to complete the prescribed processing;

wherein the plural unit processing circuits are configured to do unit processing corresponding to every item in which a computational expression of the logarithm likelihood ratio is expanded, and at least a part of the plural unit processing circuits is shared as a part of the unit processing circuits with regard to the prescribed processing related not only to the signals to be processed, but to signals related to the signals to be processed.

2. A signal processing apparatus according to claim 1, wherein a part of the plural unit processing circuits may be an adder circuit that sums output of a multiplier circuit that respectively multiplies the signals to be processed and the signals related to the signals to be processed by a prescribed multiplier value.

3. A signal processing apparatus according to claim 2, wherein the signals to be processed are temporary estimated values of encoded signals, and the prescribed multiplier value is a target value of a waveform equalization of a signal by a partial response system.

4. A signal processing apparatus according to claim 2, wherein the plural unit processing circuits further comprise a subtractor circuit for subtracting output of the adder circuit from a prescribed subtractor value.

5. A signal processing apparatus according to claim 4, wherein the prescribed subtractor value is output of a FIR filter.

6. A signal processing apparatus according to claim 1, wherein the input signal series originates from a signal series read from a recording device.

7. A signal storage system having a write channel and a read channel, wherein
the write channel comprises:
a first encoder for run-length encoding of data; a second encoder for further encoding data encoded by the first encoder, using a low density parity check code; and
a writing unit for writing the data encoded by the second encoder, to the storage device;
the read channel comprises:
a soft output detection unit for calculating likelihood for data read from the storage unit and outputting a soft decision value;
a second decoder, corresponding to the second encoder, for decoding the data outputted from the soft output detection unit; and
a first decoder, corresponding to the first encoder, for further decoding the data decoded by the second decoder;
the second decoder applies prescribed processing to inputted data to compute the logarithm likelihood ratio, and comprises:
plural unit processing circuits for executing unit processing of a part of the prescribed processing, for, respectively, data elements to be processed, belonging to the input data, that are now about to undergo the prescribed processing, and to a prescribed number of data elements related to the data elements to be processed; and
a combined circuit for integrating output of the plural unit processing circuits, to complete the prescribed processing; and
the plural unit processing circuits are configured to do unit processing corresponding to every item in which a computational expression of the logarithm likelihood ratio is expanded, and at least a part of the plural the unit processing circuits is shared as a part of the unit processing circuits with regard to the prescribed processing related not only to the data elements to be processed, but to the data elements related to the data elements to be processed.

8. A signal storage system according to claim 7, further comprising:
a storage device for storing data; and
a controller for controlling writing of data to the storage device, and reading of data from the storage device;
wherein the read channel, in accordance with an instruction of the controller, reads data stored in the storage device, and the write channel, in accordance with an instruction of the controller, writes the data to the storage device.

9. A signal storage system according to claim 7, wherein the system is integrated on at least one semi-conductor board.

* * * * *